United States Patent
Kim et al.

(10) Patent No.: US 11,520,694 B2
(45) Date of Patent: Dec. 6, 2022

(54) DATA STORAGE DEVICE AND OPERATING METHOD THEREOF

(71) Applicant: SK hynix Inc., Gyeonggi-do (KR)

(72) Inventors: Jin Woong Kim, Gyeonggi-do (KR); Yeong Sik Yi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 125 days.

(21) Appl. No.: 16/586,381

(22) Filed: Sep. 27, 2019

(65) Prior Publication Data

US 2020/0310956 A1 Oct. 1, 2020

(30) Foreign Application Priority Data

Mar. 28, 2019 (KR) .................. 10-2019-0035531

(51) Int. Cl.
*G06F 12/02* (2006.01)

(52) U.S. Cl.
CPC ...... *G06F 12/0238* (2013.01); *G06F 12/0253* (2013.01); *G06F 2212/1044* (2013.01)

(58) Field of Classification Search
CPC ............. G06F 12/0238; G06F 12/0253; G06F 2212/1044
See application file for complete search history.

(56) References Cited

U.S. PATENT DOCUMENTS

| 2016/0062885 A1* | 3/2016 | Ryu | ............ G06F 12/0246 |
| | | | 711/103 |
| 2018/0024779 A1* | 1/2018 | Kojima | ............ G06F 3/0604 |
| | | | 711/103 |
| 2019/0095123 A1* | 3/2019 | Lin | ............ G06F 3/061 |

FOREIGN PATENT DOCUMENTS

KR 1020150139112 12/2015

\* cited by examiner

*Primary Examiner* — Ramon A. Mercado
(74) *Attorney, Agent, or Firm* — IP & T Group LLP

(57) ABSTRACT

A data storage device includes a nonvolatile memory including a plurality of memory blocks and page buffers for data input/output, the page buffers being electrically connected to the plurality of memory blocks, respectively, and a controller configured to, when a number of free memory blocks among the plurality of memory blocks is equal to or less than a predetermined threshold number, select, as a candidate source memory block group, memory blocks each having a number of valid pages equal to or less than a predetermined number within the nonvolatile memory, select, as a source memory block, a memory block having a minimum amount of time required to read valid data from the valid page within the candidate source memory block group and perform a garbage collection operation to the source memory block.

17 Claims, 13 Drawing Sheets

VPCT (Valid Page Count Table)

| D1/PL1/BLK1 | D1/PL2/BLK1 | ... | Di/PL4/BLK1 |
|---|---|---|---|
| D1/PL1/BLK2 | D1/PL2/BLK2 | ... | Di/PL4/BLK2 |
| ⋮ | ⋮ | ⋱ | ⋮ |
| D1/PL1/BLKj | D1/PL2/BLKj | ... | Di/PL4/BLKj |

FIG.6B

VPCT (Valid Page Count Table)

| D1/SBLK1 | D1/SBLK2 | ... | D1/SBLKj |
|---|---|---|---|
| D2/SBLK1 | D2/SBLK2 | ... | D2/SBLKj |
| ⋮ | ⋮ | ⋱ | ⋮ |
| Di/SBLK1 | Di/SBLK2 | ... | Di/SBLKj |

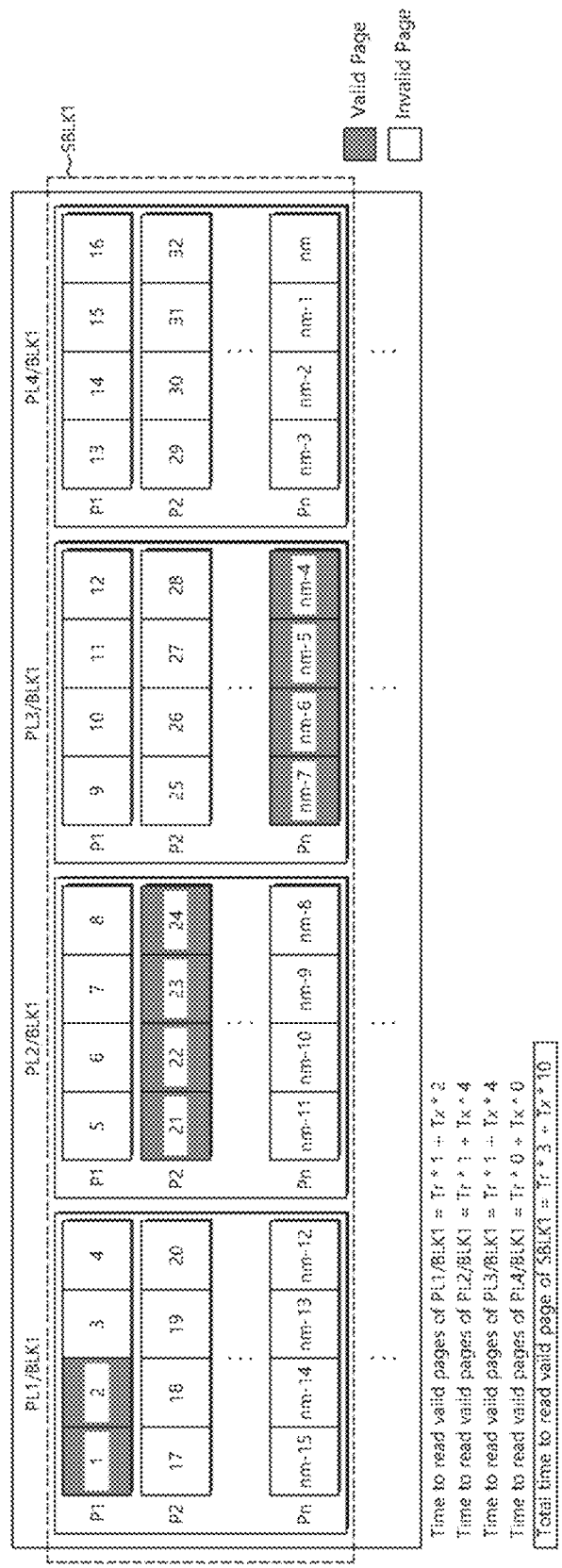

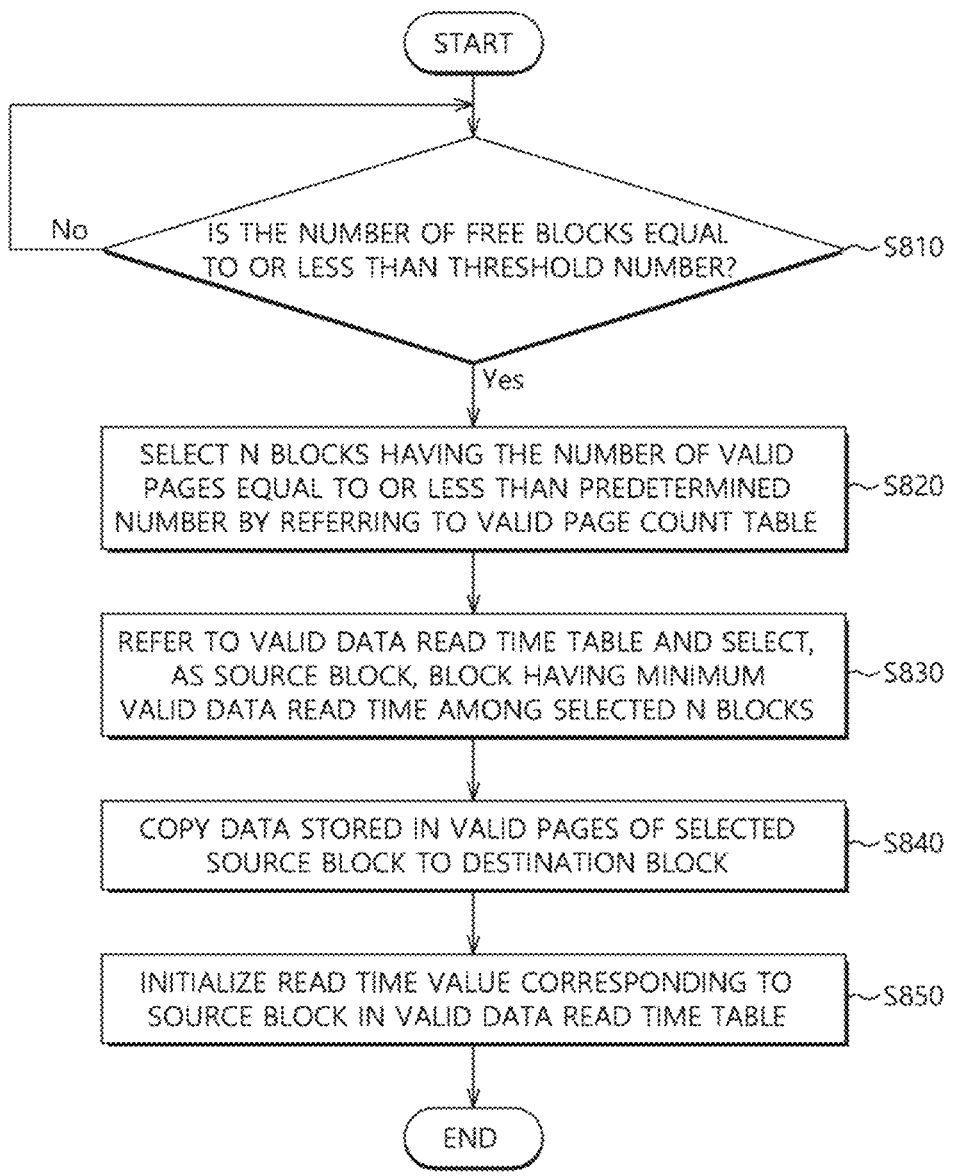

DATA STORAGE DEVICE AND OPERATING METHOD THEREOF

CROSS-REFERENCES TO RELATED APPLICATION

The present application claims priority under 35 U.S.C. § 119(a) to Korean application number 10-2019-0035531, filed on Mar. 28, 2019, which is incorporated herein by reference in its entirety.

BACKGROUND

1. Technical Field

Various embodiments generally relate to an electronic device, and more particularly, to a data storage device and an operating method thereof.

2. Related Art

Recently, a paradigm for a computer environment has been changed to ubiquitous computing which enables a computer system to be used anytime and anywhere. Therefore, the use and demand of portable electronic devices such as cellular phones, digital cameras, and notebook computers is rapidly increasing. Such portable electronic devices generally use a data storage device using a memory apparatus. The data storage device is used to store data used in the portable electronic devices.

The data storage device using the memory apparatus is advantageous in that stability and durability are excellent due to the absence of a mechanical driving unit. Furthermore, information access speed is very fast, and power consumption is relatively low. The data storage device having such advantages includes a universal serial bus (USB) memory apparatus, a memory card having various interfaces, a universal flash storage (UFS) device, and a solid state drive.

SUMMARY

A data storage device capable of minimizing a garbage collection operation time and an operating method thereof are described herein.

In an embodiment, a data storage device includes: a nonvolatile memory including a plurality of memory blocks and page buffers for data input/output, the page buffers being electrically connected to the plurality of memory blocks, respectively; and a controller configured to, when a number of free memory blocks among the plurality of memory blocks is equal to or less than a predetermined threshold number, select, as a candidate source memory block group, memory blocks each having a number of valid pages equal to or less than a predetermined number within the nonvolatile memory, select, as a source memory block, a memory block having a minimum amount of time required to read valid data from the valid page within the candidate source memory block group and perform a garbage collection operation to the source memory block.

In an embodiment, an operating method of a data storage device includes: determining whether a number of free memory blocks among the plurality of memory blocks is equal to or less than a predetermined threshold number; selecting, as a candidate source memory block group, memory blocks each having a number of valid pages equal to or less than a predetermined number within the nonvolatile memory when the number of free memory blocks is equal to or less than the threshold number; selecting, as a source memory block, a memory block having a minimum amount of time required to read valid data from the valid page within the candidate source memory block group, and performing a garbage collection operation to the source memory block.

In an embodiment, an operating method of a controller includes: selecting a source block having a least amount of time required to read data from valid pages therein among memory blocks each having a lesser number of valid pages than a threshold within a memory device; and controlling the memory device to copy the data into a destination block.

In accordance with embodiments, it is possible to perform garbage collection by selecting a block having a small number of valid pages and a short valid data read time as the source block, so that the garbage collection operation time is minimized.

Furthermore, it is possible to adjust the garbage collection operation time according to the valid data read time of each of the candidate source blocks in which the number of valid pages is equal to or less than a predetermined threshold number, so that it is possible to improve the operation performance of the data storage device.

BRIEF DESCRIPTION OF THE DRAWINGS

FIG. 4 is an exemplary diagram illustrating a super block obtained by grouping a plurality of blocks.

FIG. 6A and FIG. 6B are diagrams illustrating a configuration example of a valid page count table.

FIG. 7A and FIG. 7B are diagrams illustrating an example in which valid page read times of two super blocks with substantially the same number of valid pages are different from each other.

FIG. 8 is a flowchart illustrating an operating method of a data storage device in accordance with an embodiment.

DETAILED DESCRIPTION

Hereinafter, embodiments will be described with reference to the accompanying drawings.

Figure 1:
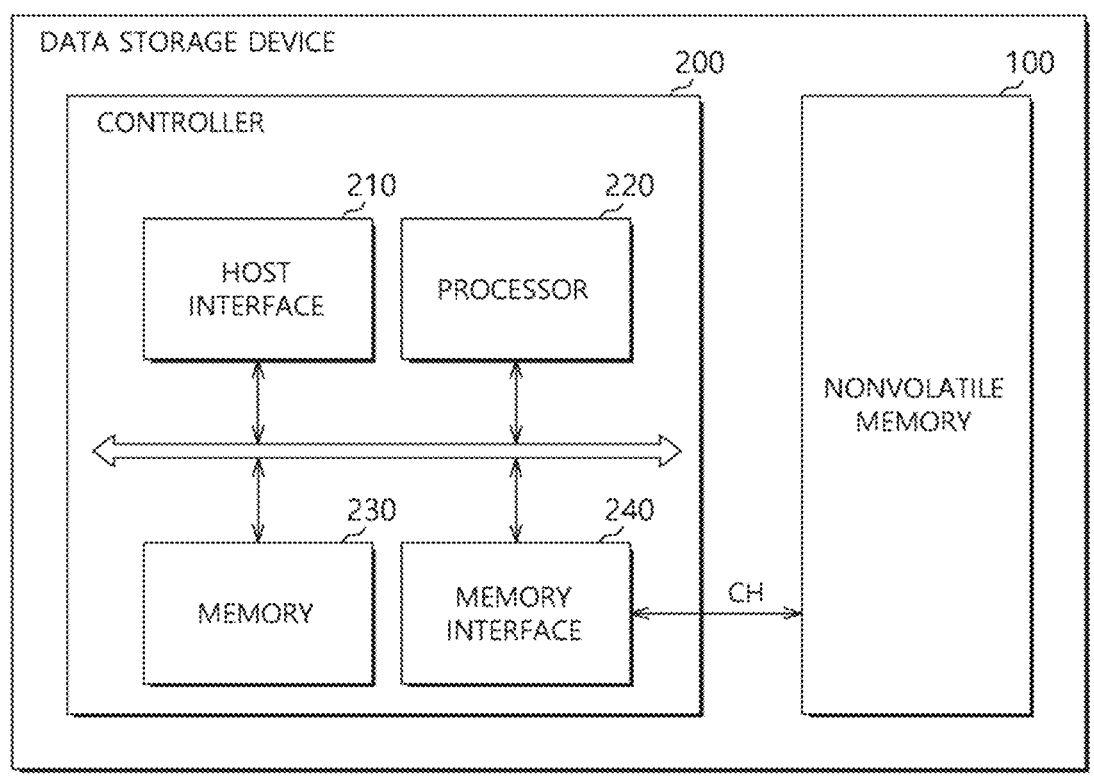
FIG. 1 is a diagram illustrating a data storage device in accordance with an embodiment.

FIG. 1 is an exemplary diagram illustrating a configuration of a data storage device 10 in accordance with an embodiment.

Referring to FIG. 1, the data storage device 10 in accordance with the present embodiment may store data which is accessed by a host device (not illustrated) such as a cellular phone, an MP3 player, a laptop computer, a desktop computer, a game machine, a television, and an in-vehicle infotainment system. The data storage device 10 may be called a memory system.

The data storage device 10 may be fabricated as any one of various types of storage devices according to an interface protocol electrically connected to the host device. For example, the data storage device 10 may be configured as any one of various types of storage devices such as a multimedia card in the form of a solid state drive (SSD), an MMC, an eMMC, an RS-MMC, or a micro-MMC, a secure digital card in the form of an SD, a mini-SD, or a micro-SD, a universal serial bus (USB) storage device, a universal flash storage (UFS) device, a storage device in the form of a personal computer memory card international association (PCMCIA) card, a storage device in the form of a peripheral component interconnection (PCI) card, a storage device in the form of a PCI express (PCI-E) card, a compact flash (CF) card, a smart media card, and a memory stick.

The data storage device 10 may be fabricated as any one of various types of packages. For example, the data storage device 10 may be fabricated as any one of various types of packages such as a package on package (POP), a system in package (SIP), a system on chip (SOC), a multi-chip package (MCP), a chip on board (COB), a wafer-level fabricated package (WFP), and a wafer-level stack package (WSP).

The data storage device 10 may include a nonvolatile memory 100 and a controller 200.

The nonvolatile memory 100 may operate as a storage medium of the data storage device 10. The nonvolatile memory 100 may be configured as any one of various types of nonvolatile memories, such as a NAND flash memory apparatus, a NOR flash memory apparatus, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and a resistive random access memory (ReRAM) using a transition metal oxide, according to memory cells.

The nonvolatile memory 100 may include a memory cell array (not illustrated) having a plurality of memory cells arranged in intersection areas of a plurality of word lines (not illustrated) and a plurality of bit lines (not illustrated).

For example, each memory cell of the memory cell array may be a single level cell (SLC) that stores one bit, a multi-level cell (MLC) capable of storing two bits of data, a triple level cell (TLC) capable of storing three bits of data, or a quad level cell (QLC) capable of storing four bits of data. The memory cell array may include at least one of the single level cell, the multi-level cell, the triple level cell, and the quad level cell. For example, the memory cell array may include memory cells having a two-dimensional horizontal structure or memory cells having a three-dimensional vertical structure. The configuration of the nonvolatile memory 100 will be described in detail below with reference to the drawings.

The controller 200 may control overall operations of the data storage device 10 by executing firmware or software loaded on a memory 230. The controller 200 may decode and execute a code type instruction or an algorithm such as firmware or software. The controller 200 may be implemented as hardware or a combination of hardware and software.

The controller 200 may include a host interface 210, a processor 220, the memory 230, and a memory interface 240. Although not illustrated in FIG. 1, the controller 200 may further include an error correction code (ECC) circuit that generates a parity by ECC-encoding write data provided from the host device and ECC-decoding read data read from the nonvolatile memory 100 by using the parity.

The host interface 210 may serve as an interface between the host device and the data storage device 10 in correspondence to the protocol of the host device. For example, the host interface 210 may communicate with the host device through any one of protocols such as a universal serial bus (USB), a universal flash storage (UFS), a multimedia card (MMC), a parallel advanced technology attachment (PATA), a serial advanced technology attachment (SATA), a small computer system interface (SCSI), a serial attached SCSI (SAS), a peripheral component interconnection (PCI), and a PCI express (PCI-E).

The processor 220 may be composed of a micro control unit (MCU) and a central processing unit (CPU). The processor 220 may process requests transmitted from the host device. In order to process the requests transmitted from the host device, the processor 220 may execute the code type instruction or algorithm loaded on the memory 230, that is, the firmware, and control internal function blocks such as the host interface 210, the memory 230, and the memory interface 240, and the nonvolatile memory 100.

The processor 220 may generate control signals for controlling the operation of the nonvolatile memory 100 on the basis of the requests transmitted from the host device, and provide the generated control signals to the nonvolatile memory 100 through the memory interface 240.

The memory 230 may be composed of a random access memory such as a dynamic random access memory (DRAM) or a static random access memory (SRAM). The memory 230 may store the firmware that is executed by the processor 220. Furthermore, the memory 230 may store data required for executing the firmware, for example, meta data. That is, the memory 230 may operate as a working memory of the processor 220.

The memory 230 may include a data buffer (not illustrated) for temporarily storing write data to be transmitted from the host device to the nonvolatile memory 100, or read data to be transmitted from the nonvolatile memory 100 to the host device. That is, the memory 230 may operate as a buffer memory.

The memory interface 240 may control the nonvolatile memory 100 under the control of the processor 220. The memory interface 240 may also be called a memory controller. The memory interface 240 may provide the control signals to the nonvolatile memory 100. The control signals may include a command, an address, an operation control signal and the like for controlling the nonvolatile memory 100. The memory interface 240 may provide the nonvolatile memory 100 with data, or may receive data from the nonvolatile memory 100.

Figure 2:
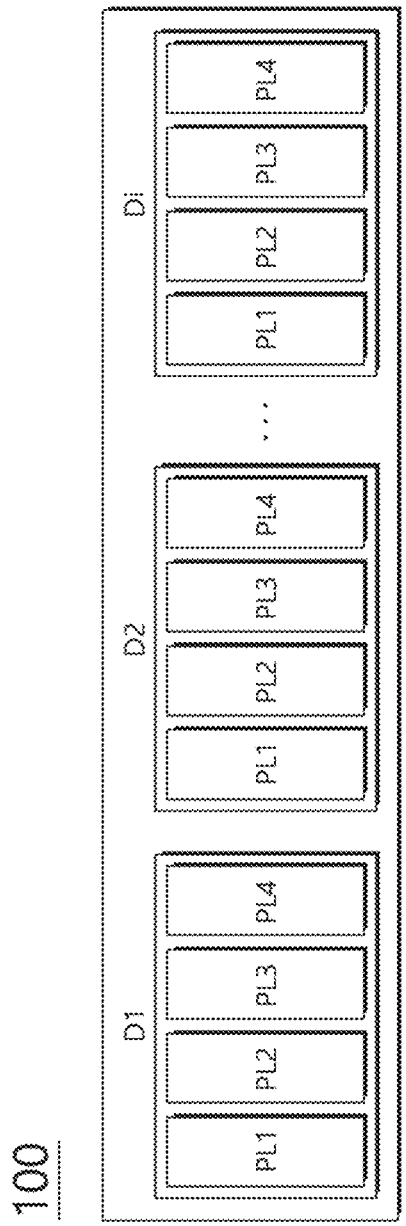
FIG. 2 is a diagram illustrating a configuration of a nonvolatile memory of FIG. 1.
Figure 3:
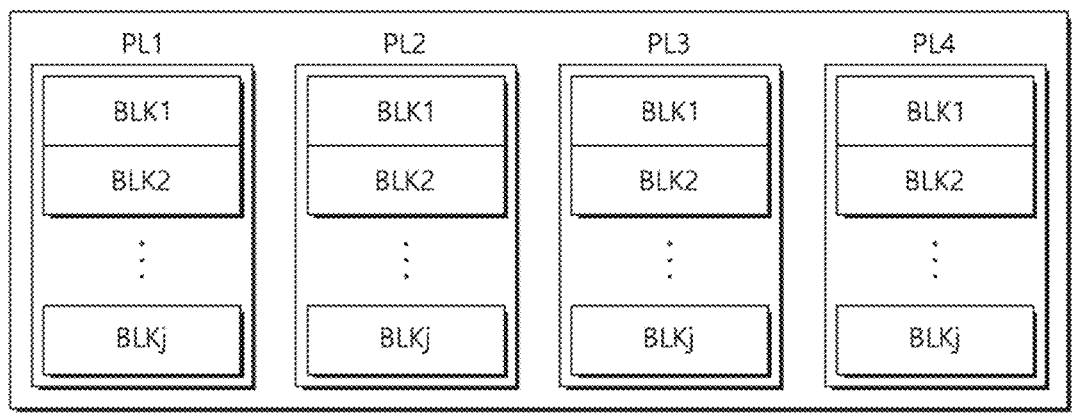
FIG. 3 is a diagram illustrating a configuration of a die of FIG. 2.
Figure 4:
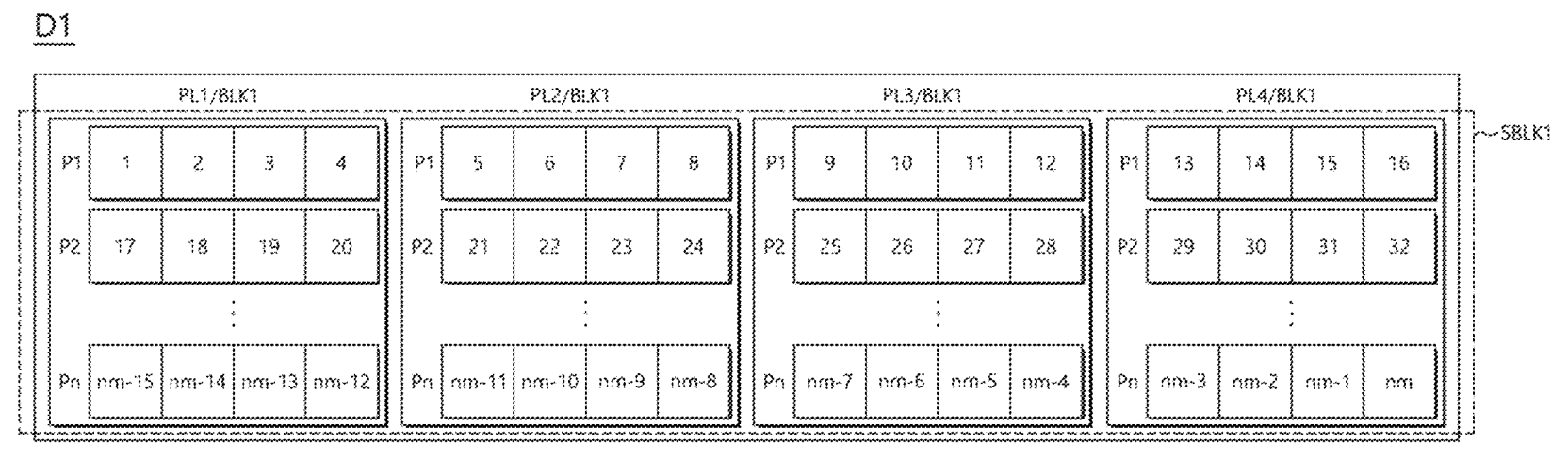

FIG. 2 is a diagram illustrating a configuration of the nonvolatile memory 100, FIG. 3 is a diagram illustrating a configuration of a die included in the nonvolatile memory 100, and FIG. 4 is a diagram illustrating a super block obtained by grouping a plurality of blocks.

Referring to FIG. 2, the nonvolatile memory 100 may include a plurality of dies D1 to Di. Each of the plurality of dies D1 to Di may include a plurality of planes. For convenience of description, although FIG. 2 illustrates that each of the dies D1 to Di includes four planes PL1 to PL4, the number of planes included in each of the dies D1 to Di is not particularly limited thereto.

Referring to FIG. 3, one die (for example, die 1 (D1)) may include first to fourth planes PL1 to PL4. Each of the first to fourth planes PL1 to PL4 may include a plurality of blocks (or memory blocks), respectively. For example, each of the first to fourth planes PL1 to PL4 may include j blocks (j may be a natural number equal to or greater than 1). Each of plurality of blocks may include a plurality of pages.

Referring to FIG. 4, one super block SBLK1 may be formed by grouping first blocks BLK1 included in each of the first to fourth planes PL1 to PL4 of the die 1 (D1). For convenience of description, although FIG. 4 illustrates that the super block SBLK1 is formed by grouping the first blocks BLK1 of the first to fourth planes PL1 to PL4 of the die 1 (D1), a method for forming the super block is not particularly limited thereto and it will be obvious to those skilled in the art that the method for forming the super block may be configured in various ways depending on design and needs. In FIG. 4, reference numeral 'P1 to Pn' may denote page numbers. Each of the first blocks BLK1 may include n pages (n may be a natural number equal to or greater than 1).

The first to $n^{th}$ pages P1 to Pn illustrated in FIG. 4 may indicate physical pages. For example, in the first blocks BLK1 of the first to fourth planes PL1 to PL4, the first pages P1 may be electrically connected to one word line (for example, a first word line (not illustrated)). Similarly, in the first blocks BLK1 of the first to fourth planes PL1 to PL4, the second to $n^{th}$ pages P2 to Pn may be electrically connected to second to $n^{th}$ word lines, respectively.

As illustrated in FIG. 4, each page may be composed of a plurality of mapping units. The mapping unit may indicate a data size corresponding to one logical address received from the host device. For example, the data size corresponding to one logical address may be 4 Kbyte. For convenience of description, FIG. 4 illustrates an example in which one physical page is composed of four mapping units.

As described above, pages with the same number in the super block SBLK1 may be electrically connected to the same word line. Accordingly, during a write operation or a read operation, data may be simultaneously written in a plurality of pages electrically connected to the same word line or data may be simultaneously read from the plurality of pages.

Figure 5:
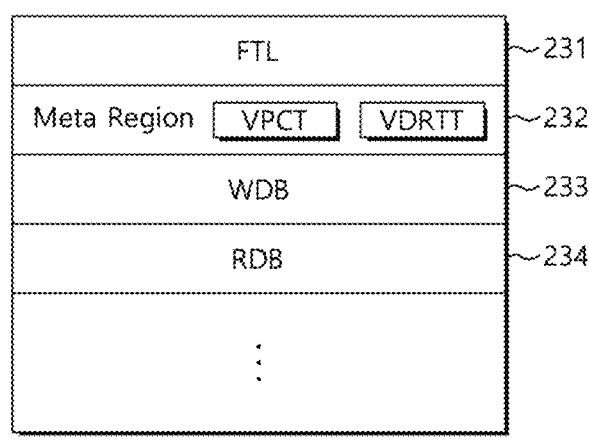
FIG. 5 is a diagram illustrating a memory of FIG. 1.

FIG. 5 is a diagram illustrating the memory 230 of FIG. 1.

Referring to FIG. 5, the memory 230 in accordance with the present embodiment may include a first region 231 where a flash translation layer (FTL) is stored, a second region 232 used as a meta region where meta data is stored, a third region 233 used as a write data buffer (WDB) where write data is temporarily stored, a fourth region 234 used as a read data buffer (RDB) where read data is temporarily stored, or the like. It will be obvious to those skilled in the art that the memory 230 may include regions used for various purposes in addition to the aforementioned regions.

When the nonvolatile memory 100 is configured as a flash memory apparatus, the processor 220 may control a unique operation of the nonvolatile memory 100, and execute software called the flash translation layer (FTL) in order to provide device compatibility to the host device. Through the execution of the flash translation layer (FTL), the host device may recognize the data storage device 10 as a general data storage device such as a hard disk and use the data storage device 10. The flash translation layer (FTL) stored in the first region 231 of the memory 230 may include modules for performing various functions and meta data required for executing the modules. The flash translation layer (FTL) may be stored in a system region (not illustrated) of the nonvolatile memory 100, and when the data storage device 10 is powered on, the flash translation layer (FTL) may be read from the system region of the nonvolatile memory 100 and stored in the first region 231 of the memory 230.

The flash translation layer (FTL) may include a map module, a garbage collection module, a wear leveling module or the like, but is not particularly limited thereto. For example, the flash translation layer (FTL) may further include a write module, a read module, a bad block management module, an address map or the like.

The garbage collection module may manage the nonvolatile memory 100 and the memory 230 to perform an operation of collecting valid data distributed and stored in the memory blocks of the nonvolatile memory 100 into one memory block and erasing invalid data.

The nonvolatile memory 100 configured as the flash memory apparatus does not support data overwrite due to its structural characteristics. When data is rewritten in a memory cell where data is stored, reliability of the data stored in the memory cell is not guaranteed. Therefore, in order to write data in a memory cell where data has been stored, an erase operation needs to be first performed.

Since an erase operation for the nonvolatile memory 100 is performed for each memory block, considerably long time is required. Therefore, when a memory cell corresponding to a write address is in a written state, the processor 220 writes data in another memory cell already in an erased state, instead of writing data after erasing the memory cell. In such a case, data stored in the memory cell, which is to be originally written, becomes invalid data as old data, and the data stored in the other memory cell becomes valid data as the latest data.

Therefore, the valid data and the invalid data are mixed in the block of the nonvolatile memory 100. If necessary, that is, when the number of free blocks is equal to or less than a predetermined threshold number, the processor 220 may perform a garbage collection operation of selecting a block having a small valid data size as a source block and copying valid data in the source block to a destination block by driving the garbage collection module. Therefore, the source block may be classified as a free block where only invalid data exists.

As described above, in general, when the garbage collection operation is performed, a block having the smallest number of valid pages is selected as the source block. However, a minimum number of valid pages may not guarantee a minimum valid data read time. For example, when there are a first block having a first valid page number and a second block having a second valid page number larger than the first valid page number, time to read valid data from the first block may be longer than time to read valid data from the second block. In such a case, even though a block having a minimum number of valid pages is selected as the source block, the garbage collection operation time may increase.

Therefore, in the present embodiment, in order to minimize the garbage collection operation time, among N blocks having the number of valid pages equal to or less than a predetermined threshold value, a block having a minimum valid data read time is selected as the source block (N may be a natural number equal to or greater than 1).

Referring back to FIG. 5, the meta region 232 of the memory 230 may store a valid page count table (VPCT) and a valid data read time table (VDRTT). The valid page count table (VPCT) and the valid data read time table (VDRTT) may be generated and stored by the processor 220. Furthermore, values stored in the valid page count table (VPCT) and the valid data read time table (VDRTT) may be updated whenever a map update is performed.

For example, the processor 220 may generate, store, and update the valid page count table (VPCT) and the valid data read time table (VDRTT) by driving the map module. The map module may be a functional module that manages the nonvolatile memory 100 and the memory 230 to perform operations related to the map data. The operations related to the map data may largely include a map update operation and a map caching operation, but are not particularly limited thereto.

The map module may check the number of valid pages existing in each block of the nonvolatile memory 100 while performing the map update operation, and store or update the number of valid pages of each block at an entry corresponding to each block in the valid page count table (VPCT). Furthermore, the map module may calculate amounts of time required to read all valid data stored in valid pages existing in each block, and store or update the calculated valid data read time for each block at a corresponding entry of the valid data read time table (VDRTT).

FIG. 6A and FIG. 6B are diagrams illustrating a configuration example of the valid page count table (VPCT). Specifically, FIG. 6A illustrates that the valid page count table (VPCT) is configured to include entries respectively having indexes (e.g., "D1/PL1/BLK1") corresponding to the plurality of blocks included in the nonvolatile memory 100. On the other hand, FIG. 6B illustrates that the valid page count table (VPCT) is configured to include entries respectively having indexes (e.g., "D1/SBLK1") corresponding to the plurality of super blocks obtained by grouping the plurality of blocks, In the present embodiment, although the configuration of the valid data read time table (VDRTT) is not illustrated in the drawing, the valid data read time table (VDRTT) may be implemented to have substantially the same configuration as of the valid page count table (VPCT) illustrated in FIG. 6A and FIG. 6B.

Referring to FIG. 6A, the valid page count table (VPCT) may be configured to include entries having indexes D1, PL1, and BLK1 corresponding to the first block BLK1 of the first plane PL1 of the die 1 (D1) to indexes Di, PL4, and BLKj corresponding to a $j^{th}$ block BLKj of the fourth plane PL4 of the die i (Di). Therefore, the number of entries included in the valid page count table (VPCT) illustrated in FIG. 6A may be substantially the same as that of the blocks included in the nonvolatile memory 100.

Referring to FIG. 6B, the valid page count table (VPCT) may be configured to include entries having indexes D1 and SBLK1 corresponding to the first super block SBLK1 of the die 1 (D1) to indexes Dj and SBLKj corresponding to a PI super block SBLKj of the die i (Di). Therefore, the number of entries included in the valid page count table (VPCT) illustrated in FIG. 6B may be substantially the same as that of the super blocks included in the nonvolatile memory 100. It will be obvious to those skilled in the art that the configurations of the valid page count table (VPCT) and the valid data read time table (VDR I I) in accordance with the present embodiment are not limited to those illustrated in FIG. 6A and FIG. 6B, and may be changed depending on design or needs.

Figure 7B:
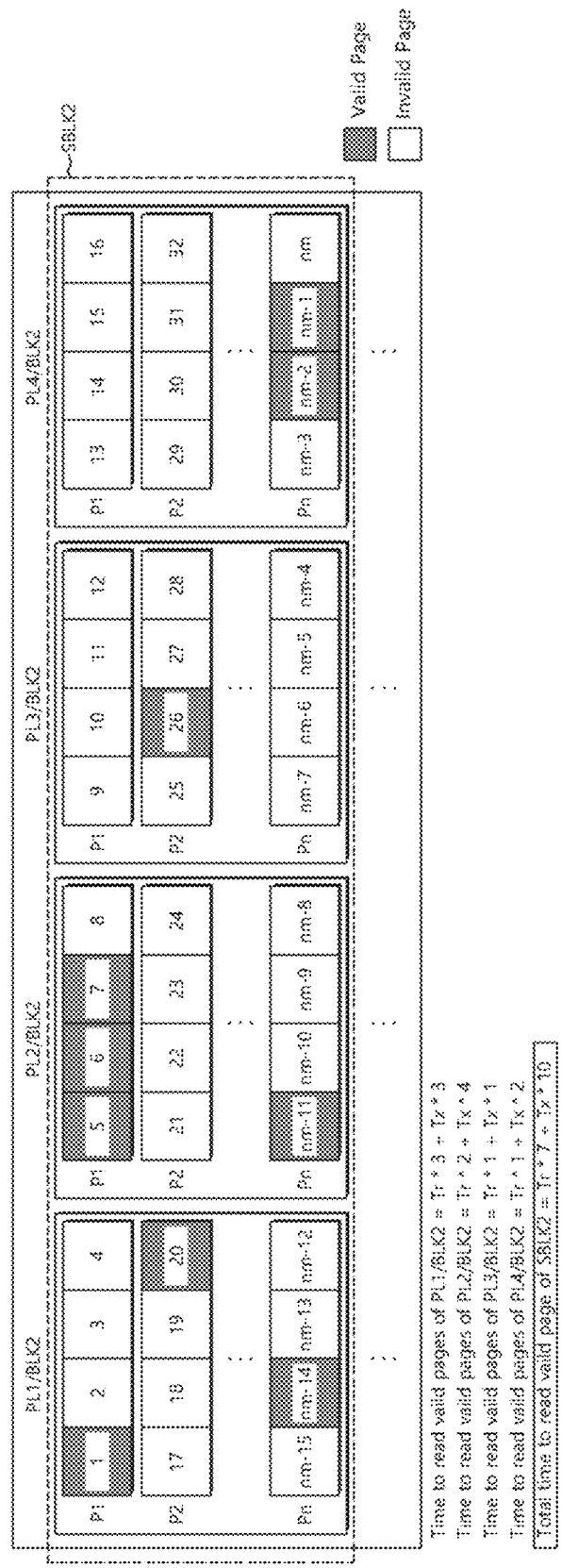

FIG. 7A and FIG. 7B are diagrams illustrating an example in which valid page read time for each of the two super blocks SBLK1 and SBLK2 with substantially the same number of valid pages are different from each other. For convenience of description, the number of valid pages of the first super block SBLK1 and the number of valid pages of the second super block SBLK2 are substantially equal as '10'.

Referring to FIG. 7A, the valid pages of the first super block SBLK1 are distributed in the first to third planes PL1 to PL3. Furthermore, some of the valid pages in the first super block SBLK1 exist in the first page P1 of the first plane PL1, some exist in the second page P2 of the second plane PL2, and others exist in the $n^{th}$ page Pn of the third plane PL3.

Therefore, the valid data in the first super block SBLK1 may be stored in a page buffer (not illustrated) by a total of three sensing operations of sensing the first page P1 of the first plane PL1, the second page P2 of the second plane PL2, and the nth page Pn of the third plane PL3 once, respectively. In FIG. 7A, 'Tr' may denote amounts of time required to sense data from memory cells electrically connected to pages and store the sensed data in the page buffer. Meanwhile, as data stored in the page buffer is transmitted to the controller 200 in a serial manner, 10 pieces of valid data stored in 10 valid pages require a total of ten pieces of data transmission time. That is, in FIG. 7A, 'Tx' may denote amounts of time required to transmit data stored in the page buffer to the controller 200. Accordingly, amounts of time required to read all the valid data in the first super block SBLK1 may be the sum of three pieces of sensing time Tr*3 and ten pieces of data transmission time Tx*10.

Referring to FIG. 7B, the valid pages of the second super block SBLK2 are distributed in the first to fourth planes PL1 to PL4. Furthermore, in the first plane PL1 of the second super block SBLK2, the valid pages are distributed in the first page P1, the second page P2, and the nth page Pn. In the second plane PL2 of the second super block SBLK2, the valid pages are distributed in the first page P1 and the nth page Pn. Furthermore, in the third plane PL3 of the second super block SBLK2, the valid pages exist in the second page P2, and in the fourth plane PL4, the valid pages exist in the $n^{th}$ page Pn.

Therefore, an operation of sensing the valid data stored in the first plane PL1 of the second super block SBLK2 is performed three times in total, an operation of sensing the valid data stored in the second plane PL2 is performed twice in total, an operation of sensing the valid data stored in the third plane PL3 is performed once, and an operation of sensing the valid data stored in the fourth plane PL4 is performed once. Accordingly, amounts of time required to read all the valid data in the second super block SBLK2 may be the sum of seven pieces of sensing time Tr*7 and ten pieces of data transmission time Tx*10.

As described above, even though the number of valid pages is the same, the amount of time required to read the valid data varies depending on how the valid pages are distributed. Therefore, in the present embodiment, blocks having the number of valid pages equal to or less than a certain number are selected as candidate source blocks (referred to as a candidate source block group), and among the candidate source blocks, a block having the shortest valid data read time is finally selected as a source block.

Furthermore, in the present embodiment, it may be determined whether the valid data read time of each of the candidate source blocks is less than a predetermined threshold time, and the total time during which the garbage collection operation is performed may be increased or decreased according to a result of the determination.

For example, when all the pieces of the valid data read time of the candidate source blocks are less than the predetermined threshold time, it may be determined that the garbage collection operation time for each candidate source block is not long, and the garbage collection operation time for the finally selected source block may be increased. In general, the garbage collection operation is not continuously performed but intermittently performed at predetermined intervals. This is for substantially preventing the garbage collection operation from affecting the execution of an operation requested from the host device.

An increase in the garbage collection operation time indicates an increase in an interval at which the garbage collection operation is performed, and consequently, the operation performance of the data storage device can be improved.

On the other hand, when all pieces of the valid data read time of the candidate source blocks are equal to or greater than the predetermined threshold time, it may be determined that the garbage collection operation time for each candidate source block becomes long and the garbage collection operation time for the finally selected source block may be decreased. That is, it is possible to quickly secure a free block by decreasing the interval at which the garbage collection operation is performed.

FIG. 8 is a flowchart illustrating an operating method of the data storage device in accordance with an embodiment. In describing the operating method of the data storage device in accordance with the embodiment with reference to FIG. 8, at least one of FIG. 1 to FIG. 5, FIG. 6A, FIG. 6B, FIG. 7A, and FIG. 7B may be referred to.

In step S810, the processor 220 of the controller 200 may determine whether the number of free blocks existing in the nonvolatile memory 100 is equal to or less than a predetermined threshold number. When the number of free blocks is equal to or less than the threshold number, the process may proceed to step S820. That is, when the number of free blocks is equal to or less than the threshold number, the garbage collection operation may be triggered. In such a case, the processor 220 may perform steps subsequent to step S820 by driving the map module, but for convenience of description, the following description will be given on the assumption that the processor 220 performs each step.

In step S820, the processor 220 may select N blocks having the number of valid pages equal to or less than a predetermined number by referring to the valid page count table (VPCT) stored in the memory 230 (N may be a natural number equal to or greater than 1). For example, the processor 220 may refer to the valid page count table (VPCT) illustrated in FIG. 6A and FIG. 6B, and detect and select one or more blocks in which the number of valid pages stored at the entries corresponding to the respective blocks is equal to or less than the predetermined number. The selected blocks may be candidate source blocks.

In step S830, the processor 220 may refer to the valid data read time table (VDRTT) stored in the memory 230 and select, as a source block, a block having a minimum (or the shortest) valid data read time among the N blocks (that is, the candidate source blocks) selected in step S820.

In step S840, the processor 220 may control the nonvolatile memory 100 to copy data stored in valid pages of the source block selected in step S830 to a destination block. When the copy of the valid data from the source block to the destination block is completed, the process may proceed to step S850.

In step S850, the processor 220 may initialize a read time value stored in the entry corresponding to the source block selected in step S830 in the valid data read time table (VDRTT) stored in the memory 230.

Figure 9:
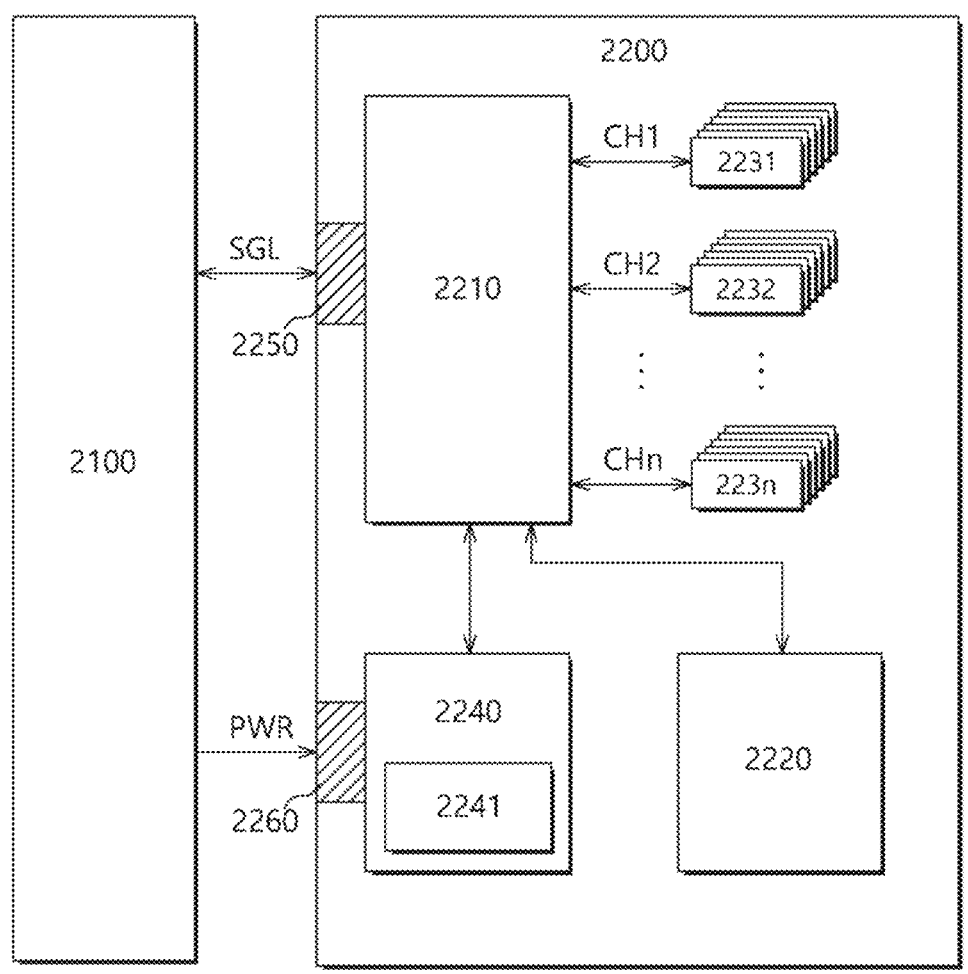
FIG. 9 illustrates a data processing system including a solid state drive (SSD) in accordance with an embodiment.

FIG. 9 illustrates a data processing system including a solid state drive (SSD) in accordance with an embodiment. Referring to FIG. 9, a data processing system 2000 may include a host apparatus 2100 and a SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of he SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 10:
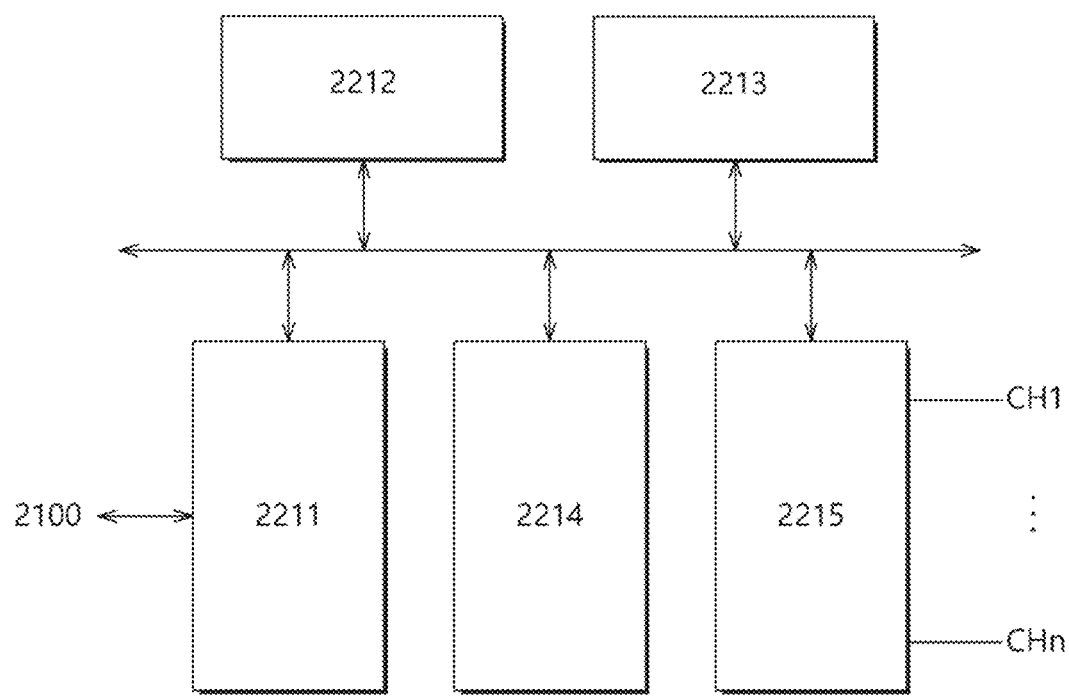
FIG. 10 illustrates a controller illustrated in FIG. 9.

FIG. 10 illustrates the controller 2210 of FIG. 9. Referring to FIG. 10, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (DATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 11:
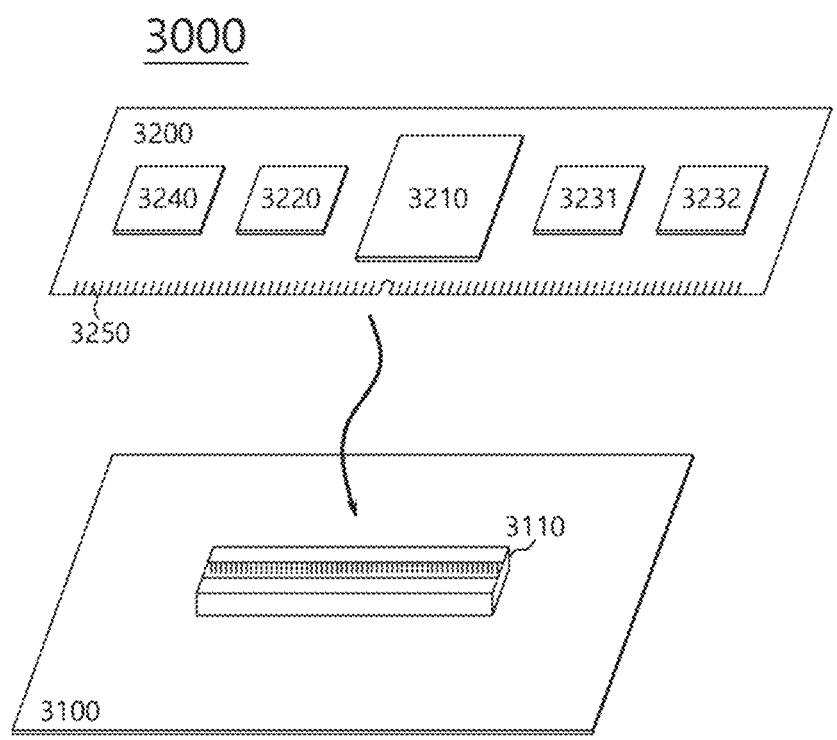
FIG. 11 illustrates a data processing system including a data storage apparatus in accordance with an embodiment.

FIG. 11 illustrates a data processing system including a data storage apparatus in accordance with an embodiment. Referring to FIG. 11, a data processing system 3000 may include a host apparatus 3100 and a data storage apparatus 3200.

The host apparatus 3100 may be configured in a board form such as a printed circuit board (PCB). Although not shown in FIG. 11, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 10.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232, according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data, and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 12:
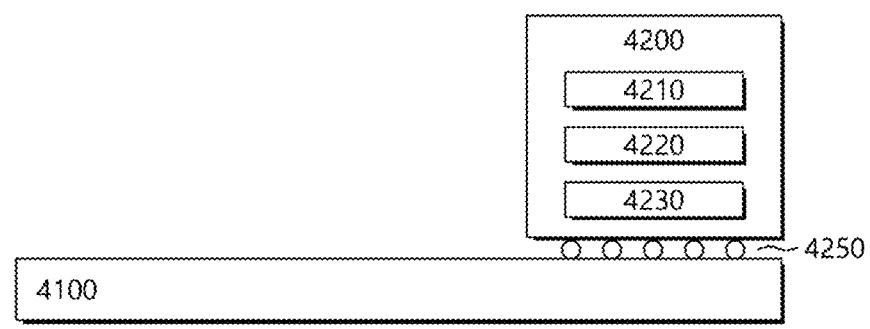
FIG. 12 illustrates a data processing system including a data storage apparatus in accordance with an embodiment.

FIG. 12 illustrates a data processing system including a data storage apparatus in accordance with an embodiment. Referring to FIG. 12, a data processing system 4000 may include a host apparatus 4100 and a data storage apparatus 4200.

The host apparatus 4100 may be configured in a board form such as a PCB. Although not shown in FIG. 12, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 10.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 13:
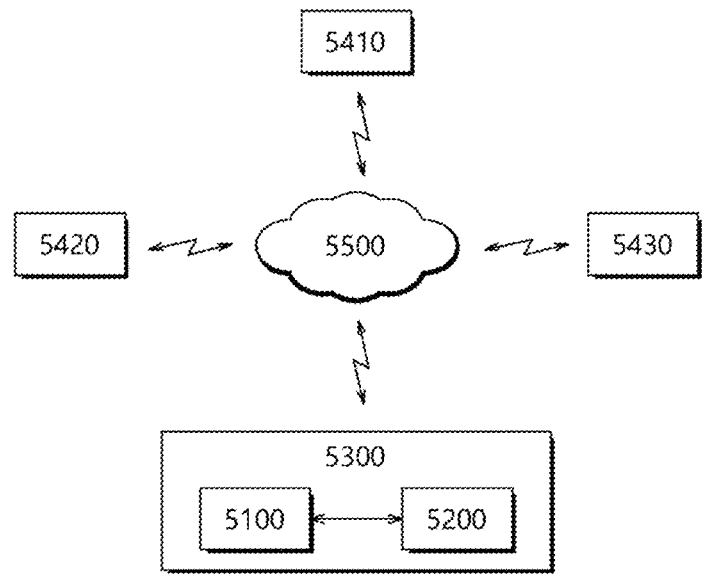
FIG. 13 illustrates a network system including a data storage apparatus in accordance with an embodiment.

FIG. 13 illustrates a network system 5000 including a data storage apparatus in accordance with an embodiment. Referring to FIG. 13, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage device 10 of FIG. 1, the SSD 2200 of FIG. 9, the data storage apparatus 3200 of FIG. 11, or the data storage apparatus 4200 of FIG. 12.

Figure 14:
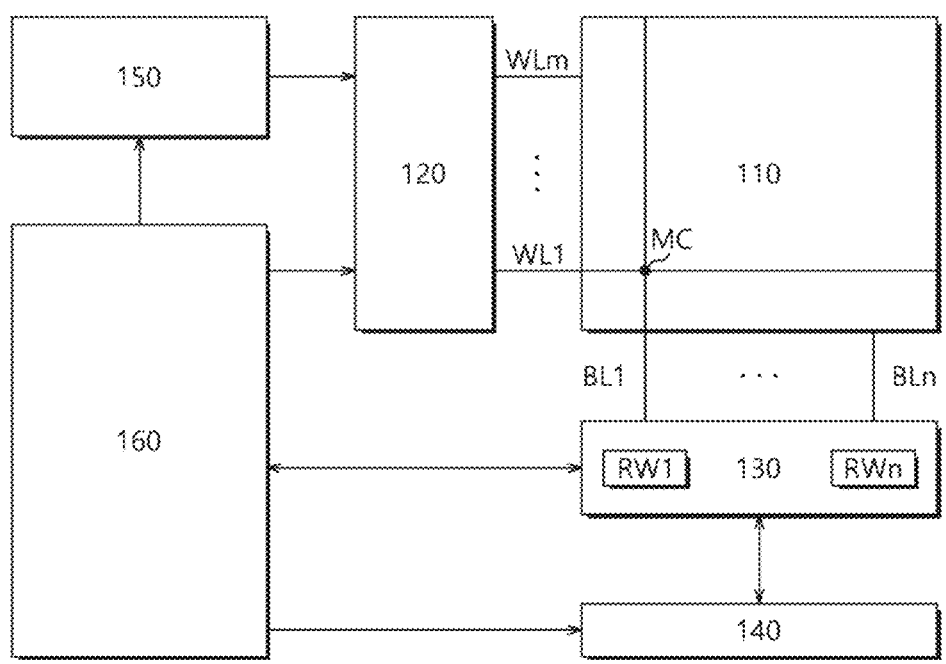
FIG. 14 illustrates a nonvolatile memory device included in a data storage apparatus in accordance with an embodiment.

FIG. 14 illustrates a nonvolatile memory device included in a data storage apparatus in accordance with an embodiment. Referring to FIG. 14, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, and an erase operation of the nonvolatile memory device 100.

This specification and the drawings disclose the preferred embodiments of the present disclosure, and although specific terms are used, they are used in general meaning for purposes of easily describing technical contents of the present disclosure and understanding of the present disclosure, and are not intended to limit the scope of the present disclosure. It is apparent to those skilled in the art to which the present disclosure pertains that other modification examples based on the technical spirit of the present disclosure may be carried out in addition to the embodiments disclosed herein.

Therefore, the scope of the present disclosure should not be limited to the described embodiments, but should be determined by the equivalents of the claims, as well as the following claims.

What is claimed is:

1. A data storage device comprising:
a nonvolatile memory comprising a plurality of memory blocks and page buffers for data input/output, the page buffers being electrically connected to the plurality of memory blocks, respectively; and
a controller configured to, when a number of free memory blocks among the plurality of memory blocks is equal to or less than a predetermined threshold number:
select, as a candidate source memory block group, one or more memory blocks each having a number of valid pages equal to or less than a predetermined number among the plurality of memory blocks within the nonvolatile memory;
select, as a source memory block, a memory block having a minimum amount of time required to read valid data from the valid pages, wherein the minimum amount of time is a shortest read time among read times of the one or more memory blocks within the candidate source memory block group; and
perform a garbage collection operation to the source memory block.

2. The data storage device according to claim 1, wherein the controller comprises a memory, wherein the memory comprises:
a valid page count table having information indicating the number of valid pages for each of the plurality of memory blocks; and
a valid data read time table having information indicating an amount of time required to read the valid data from each of the plurality of memory blocks.

3. The data storage device according to claim 2, wherein the controller selects the candidate source memory block group by referring to the valid page count table, and selects the source memory block by referring to the valid data read time table.

4. The data storage device according to claim 2, wherein the controller calculates the amount of time required to read the valid data by summing a first amount of time required to sense the valid data included in each of the plurality of memory blocks and to store the sensed valid data in the page buffer and a second amount of time required to transmit the valid data stored in the page buffer to the controller.

5. The data storage device according to claim 2, wherein the controller performs the garbage collection operation by copying the valid data stored in the source memory block to a destination memory block selected from the free memory blocks.

6. The data storage device according to claim 5, wherein the controller initializes, when the garbage collection operation is completed, the amount of time required to read valid data from the source memory block in the valid data read time table.

7. The data storage device according to claim 2, wherein the controller increases, when all the amounts of time required to read the valid data from the candidate source memory block group are less than a predetermined threshold read time, an amount of time for the garbage collection operation.

8. The data storage device according to claim 2, wherein the controller decreases, when all of the amounts of time required to read the valid data from the candidate source memory block group are equal to or greater than the predetermined threshold read time, the amount of time for the garbage collection operation.

9. An operating method of a data storage device including a nonvolatile memory including a plurality of memory blocks and page buffers for data input/output, the page buffers being electrically connected to the plurality of memory blocks, respectively, and a controller configured to control an operation of the nonvolatile memory, the operating method comprising:
determining whether a number of free memory blocks among the plurality of memory blocks is equal to or less than a predetermined threshold number;
selecting, as a candidate source memory block group, one or more memory blocks each having a number of valid pages equal to or less than a predetermined number among the plurality of memory blocks within the nonvolatile memory when the number of free memory blocks is equal to or less than the threshold number;

selecting, as a source memory block, a memory block having a minimum amount of time required to read valid data from the valid pages, wherein the minimum amount of time is a shortest read time read times of among the one or more memory blocks within the candidate source memory block group; and performing a garbage collection operation to the source memory block.

10. The operating method of the data storage device according to claim 9, wherein the selecting of the candidate source memory block group is performed by referring to a valid page count table having information indicating the number of valid pages for each of the plurality of memory blocks.

11. The operating method of the data storage device according to claim 9, wherein the selecting of the source memory block is performed by referring to a valid data read time table having information indicating an amount of time required to read the valid data from each of the plurality of memory blocks.

12. The operating method of the data storage device according to claim 11, wherein the amount of time required to read the valid data is acquired by summing a first amount of time required to sense the valid data included in each of the plurality of memory blocks and to store the sensed valid data in the page buffer and a second amount of time required to transmit the valid data stored in the page buffer to the controller.

13. The operating method of the data storage device according to claim 11, further comprising, after the performing of the garbage collection operation, initializing the amount of time required to read valid data from the source memory block in the valid data read time table.

14. The operating method of the data storage device according to claim 11, further comprising: increasing, when all of the amounts of time required to read the valid data from the candidate source memory block group are less than a predetermined threshold read time, an amount of time for the garbage collection operation.

15. The operating method of the data storage device according to claim 11, further comprising: decreasing, when all the amounts of time required to read the valid data from the candidate source memory block group are equal to or greater than the predetermined threshold read time, the amount of time for the garbage collection operation.

16. The operating method of the data storage device according to claim 9, wherein the performing of the garbage collection operation includes copying the valid data stored in the source memory block to a destination memory block selected from the free memory blocks.

17. An operating method of a controller, the operating method comprising:

selecting candidate source blocks each having a lesser number of valid pages than a threshold among a plurality of memory blocks within a memory device;

selecting a source block having a minimum amount of time required to read data from valid pages among the selected candidate source blocks; and controlling the memory device to copy the data of the selected source block into a destination block, wherein the minimum amount of time is a shortest read time among read times of the selected candidate source blocks.

\* \* \* \* \*